United States Patent [19]

Verdier

[11] 4,031,938

[45] June 28, 1977

[54] PNEUMATIC TIRE TREAD

[75] Inventor: Henri Verdier, Beauregard-l'Eveque, France

[73] Assignee: Compagnie Generale des Etablissements Michelin, raison sociale Michelin & Cie, France

[22] Filed: Feb. 26, 1976

[21] Appl. No.: 661,800

[30] Foreign Application Priority Data

Mar. 4, 1975 France ............................. 75.06814

[52] U.S. Cl. ........................... 152/209 R; D12/143
[51] Int. Cl.² ...................................... B60C 11/06
[58] Field of Search ................... 152/209 R, 209 D; D12/141–144

[56] References Cited

UNITED STATES PATENTS

| 224,378 | 7/1972 | Newman | D12/142 |
| 228,635 | 10/1973 | Vizina | D12/143 |
| 3,707,177 | 12/1972 | Bolieau | 152/209 R |
| 3,841,374 | 10/1974 | Bolieau | 152/209 R |

Primary Examiner—Drayton E. Hoffman
Assistant Examiner—Fred A. Silverberg
Attorney, Agent, or Firm—Brumbaugh, Graves, Donohue & Raymond

[57] ABSTRACT

Tire treads are made more resistant to "groove wear" without reducing adherence of the tread to wet or moist roads by providing specially located recesses and incisions in the critical zones formed by the salient angles and the reentrant angles of the broken-line circumferential ribs.

3 Claims, 3 Drawing Figures

PNEUMATIC TIRE TREAD

The present invention relates to improvements in pneumatic tires having a radial carcass reinforcement.

Tires of the above-mentioned type have a tread reinforcement formed of several plies of cords directed at different angles with respect to the circumferential direction. This reinforcement is arranged between the carcass reinforcement and the tread and is intended to stiffen the latter.

In tires of the above-mentioned type which are intended for heavy road vehicles a tread which is formed essentially of longitudinal elements is frequently used in combination with such a tread reinforcement. This tread then has circumferential ribs alternating in transverse direction with circumferential grooves. These ribs and grooves are continuous or discontinuous and have a broken-line or undulated outline.

Due to the stiffening action of the tread reinforcement, the said circumferential ribs are subject to a special type of wear known as "groove wear." This wear manifests itself by a circumferential depression of a certain depth extending along the salient angles of the said ribs.

Various means have already been proposed in order to reduce this type of wear. They are described in U.S. Pat. Nos. 3,550,665, 3,664,402 and 3,763,911.

However, these various means, even when some of them are combined with each other, do not give full satisfaction, especially with regard to the adherence of the tread to wet or moist roads. The object of the present invention is to provide another means which is effective against groove wear and does not reduce adherence of the tread to wet or moist roads.

Therefore, a pneumatic tire with a radial carcass reinforcement in accordance with the invention which is provided with a tread having circumferential ribs separated by circumferential grooves, these ribs having walls which follow a broken-line outline forming salient and reentrant angles, is characterized, on the one hand, by the fact that said ribs have:

a. a salient angle recess on each side of and near each salient angle, b. a salient angle incision having a length less than half of the width of the rib and being, with respect to a salient angle, on the outside and near each salient angle recess, c. a reentrant angle recess in each reentrant angle, and d. a reentrant angle incision having a length less than half of the width of the rib and being, with respect to a reentrant angle, on the outside and near each reentrant angle recess, and, on the other hand, by the fact that e. the distance measured in the circumferential direction between the two salient angle incisions of a salient angle is greater than the distance between the two reentrant angle incisions of a reentrant angle.

By "recess" there is understood an elimination of material effected parallel to the wall of a rib and in said wall. On the other hand, an "incision" is an interruption of material of no substantial thickness effected in a rib.

Furthermore,

"width of a rib" means the width measured along the transverse (or axial) direction of the tire;

"length of an incision" means the length of the projection of said incision in the transverse (or axial) direction of the tire.

By means of the invention, the pressures on the ground in the critical zones formed by the salient angles and the reentrant angles of a rib are first of all made uniform. This uniformity is beneficial to the resistance to groove wear. Second of all, this uniformity is obtained by means which decrease the bearing surface and therefore increase the pressure and thus the adherence of the tread to the ground. Thirdly, the said critical zones are located in the circumferential direction between the four incisions arranged in accordance with the invention. This makes it possible to control the circumferential length of these zones and therefore the distribution of the pressures on the ground along each rib, while assuring contact of said zones with the ground, which avoids the formation of a film of liquid which destroys aherence of the tread to the wet ground.

The making of contact with the ground by the said critical zones is further improved by connecting together in pairs by means of another incision the neighboring incisions located on the same sides of opposed salient angles and reentrant angles.

The effectiveness of the said incisions can be further improved by providing a recess at the places where the said salient angle incisions and reentrant angle incisions open into the circumferential grooves defining the circumferential ribs to which the invention applies.

In order to facilitate an understanding of the invention, the following description refers to the drawing in which several nonlimitative embodiments are shown.

Figure 1:
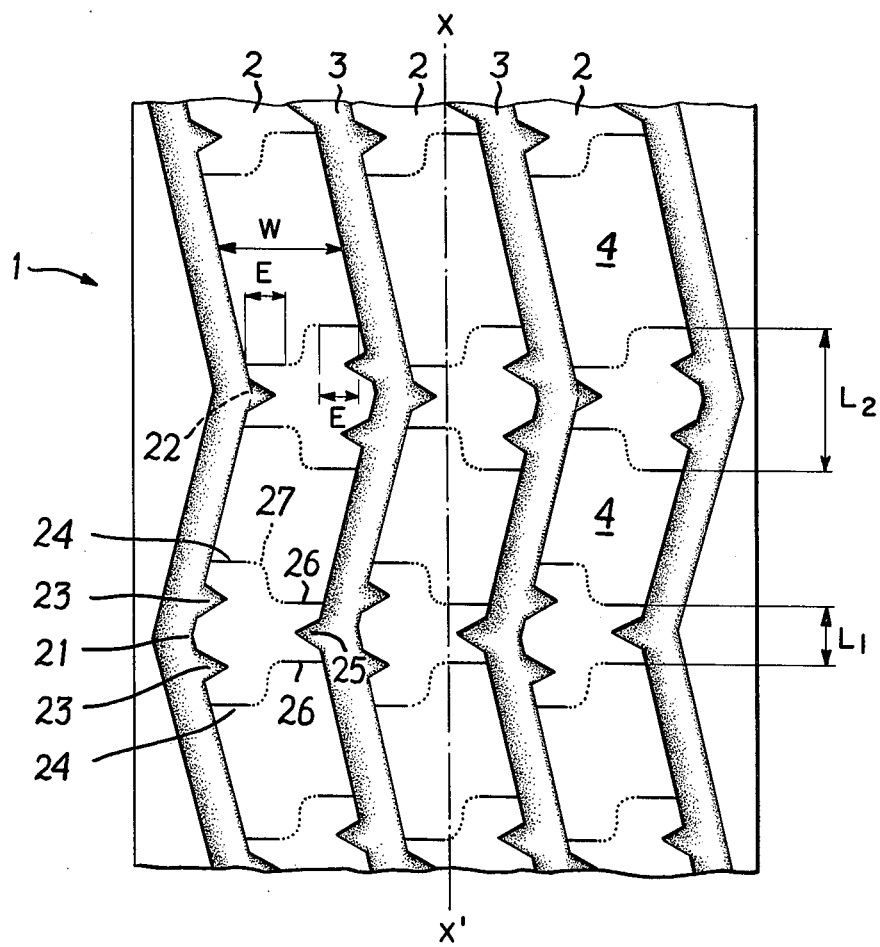
FIG. 1 shows a portion of tread, treated in accordance with the invention.

FIG. 1 shows a portion of tread 1 comprising several circumferential ribs 2 separated by circumferential grooves 3, the circumferential direction being parallel to the center line XX'. The outline of these ribs 2 follows a broken-line formed of straight line segments 4 which are of unequal length in the examples shown. The ribs 2 have salient angles 21 and reentrant angles 22 (shown in dashed line). In accordance with the invention, a salient angle recess 23 is located on opposite sides of and near each of the salient angles 21 of a rib 2. A salient angle incision 24 is located, with respect to a salient angle 21, on the outside and near each salient angle recess 23. A reentrant angle recess 25 is located in each reentrant angle 22. On either side of and near each reentrant angle recess 25 there is located a reentrant angle incision 26 so that, in accordance with one of the features of the invention, the distance $L_2$ measured in the circumferential direction between the two salient angle incisions 24 of a salient angle 21 is greater than the distance $L_1$ between the two reentrant angle incisions 26 of a reentrant angle 22.

In the example shown, the recesses 23 and 25 are of triangular cross section as seen in the direction of the axis (not shown) of the tire. The incisions 24 and 26 have a length E which is less than half of the width W of the rib 2. In order to improve the cooperation between the recesses 23 and 25 and the incisions 24 and 26 made in the critical zones surrounding the opposed salient angles 21 and the reentrant angles 22, the incisions 24 are connected to the neighboring incisions 26 by another incision 27 (shown in dotted line) which constitutes a preferred feature of the invention.

The depth of the incisions 24, 26 and 27 is at most equal to the depth of the circumferential grooves 3.

Figure 2:
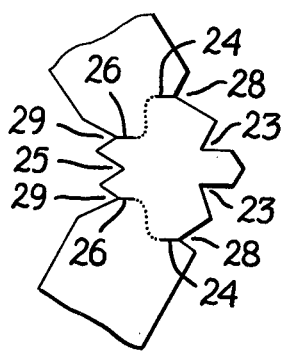
FIG. 2 shows a preferred variant of the invention.

In accordance with a preferred variant of the invention, FIG. 2 shows the case in which other recesses 28 and 29 are provided at the points where the incisions 24 and 26, respectively, open into the circumferential grooves 3. The cross sections of such recesses 28 and 29 may be different from those of the recesses 23 and 25.

Figure 3:
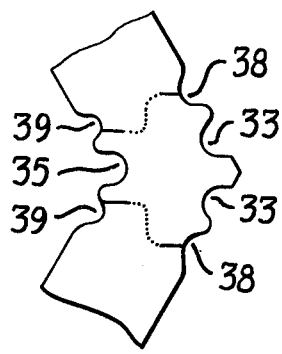
FIG. 3 shows another preferred variant of the invention.

FIG. 3 shows a variant of the embodiment of FIG. 2. In this variant the recesses 33, 35, 38, 39 no longer are of triangular cross section as in FIG. 2, but have a cross section which is defined by a curved line.

In the three examples shown in FIGS. 1 to 3, the critical zones which adjoin the salient and rentrant angles of the ribs and which are provided with recesses and incisions in accordance with the invention are separated from each other by linear rib segments. The invention of course also extends to the case in which said segments have any length and even zero length.

What is claimed is:

1. A pneumatic tire with a radial carcass reinforcement which is provided with a tread having circumferential ribs separated by circumferential grooves, said ribs having walls which follow a broken-line outline forming salient and reentrant angles, characterized by the fact that said ribs have:

a. a salient angle recess on each side of and near each said salient angle;
    b. two salient angle incisions for each said salient angle wherein each said incision has a length less than half of the width of the rib and being, with respect to each said salient angle, on the outside and near each said salient angle recess;
    c. a reentrant angle recess in each said reentrant angle;
    d. two reentrant angle incisions for each said reentrant angle wherein each said incision has a length less than half of the width of the rib and being, with respect to each said reentrant angle, on the outside and near each said reentrant angle recess;

and by the fact that e. the distance measured in the circumferential direction between the two salient angle incisions of each said salient angle is greater than the distance between the two reentrant angle incisions of each said reentrant angle.

2. The pneumatic tire according to claim 1, characterized by the fact that another incision connects together neighboring incisions located on the same sides of opposed said salient angles and said reentrant angles.

3. The pneumatic tire according to claim 1, characterized by the fact that a recess is located at the place where each said salient angle incision and each said reentrant angle incision opens into a circumferential groove.

* * * * *